United States Patent [19]

Wah Lo et al.

[11] 3,953,869
[45] Apr. 27, 1976

[54] STEREOSCOPIC PHOTOGRAPHY APPARATUS

[75] Inventors: Allen Kwok Wah Lo, Atlanta; Jerry Curtis Nims, Dunwoody, both of Ga.

[73] Assignee: Dimensional Development Corporation, Atlanta, Ga.

[22] Filed: Sept. 24, 1974

[21] Appl. No.: 508,823

[52] U.S. Cl. ............................................. 354/115
[51] Int. Cl.² ........................................... G03B 35/08
[58] Field of Search ............ 354/112, 113, 114, 115

[56] References Cited
UNITED STATES PATENTS

| | | | |
|---|---|---|---|
| 1,542,730 | 6/1925 | Richards | 354/113 |
| 1,942,638 | 1/1934 | Draper | 354/112 |
| 3,482,913 | 12/1969 | Glenn | 355/33 |
| 3,518,929 | 7/1970 | Glenn | 354/113 |
| 3,666,465 | 5/1972 | Winner | 354/113 |
| 3,800,307 | 3/1974 | Wechsler | 354/112 |

*Primary Examiner*—John M. Horan
*Attorney, Agent, or Firm*—Brumbaugh, Graves, Donohue & Raymond

[57] ABSTRACT

In the illustrative embodiments of the invention disclosed, autostereoscopic pictures are produced by taking a series of two-dimensional views of an object field and projecting them in an enlarger onto lenticular print film. Adjustable-focus and fixed-focus cameras are provided for taking the two-dimensional views, either simultaneously or sequentially, in a manner which automatically accounts for the effect of variation of the camera-to-object distance on the configuration of the enlarger-lenticular print film system, thereby allowing the parameters of the enlarger-print film system to be held constant. The number of enlarging lenses employed may correspond to the number of two-dimensional views to be projected, by virtue of which the stereoscopic picture may be composed in a single projection step, or a single enlarging lens may be used to project the two-dimensional views in sequence. As another feature of the invention, substantially uninterrupted and non-overlapping lineiform image bands of high image quality are formed on all areas of the lenticular film by scanning the projected images from each two-dimensional view over a predetermined distance along the photosensitive surface.

21 Claims, 12 Drawing Figures

INDIRECT PROCESS

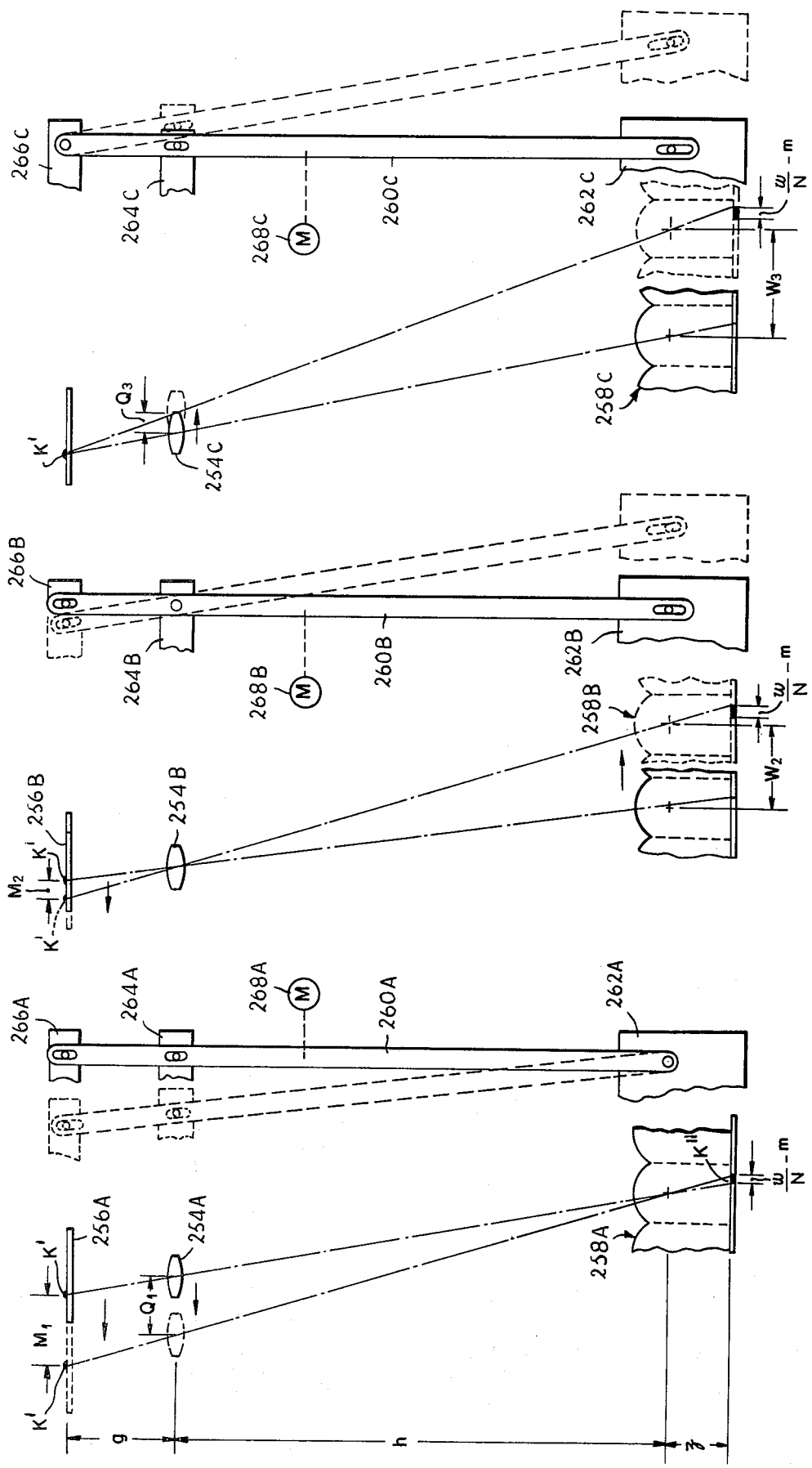

STEREOSCOPIC PHOTOGRAPHY APPARATUS

BACKGROUND OF THE INVENTION

1. Field of the Invention

The present invention relates generally to the production of autostereoscopic pictures of the type employing lenticular screens. More specifically, it concerns novel methods and apparatus for taking and composing such pictures which greatly simplify these processes relative to the prior state of the art.

2. The Prior Art

Lenticular screen-type autostereoscopic pictures are produced basically in two ways, the direct or "in camera" technique, in which the taking and composing steps are both carried out within the camera, and the indirect technique, in which a number of two-dimensional views of an object field are made from different vantage points and the three-dimensional picture is subsequently composed by projecting the two-dimensional images through a composing lenticular screen. As practiced in the prior art, however, both techniques have been subject to use, quality and/or cost limitations which have all but precluded their widespread commercial application.

For example, the direct technique typically requires a specially constructed camera, embodying a lenticular screen sheet located on the emulsion side of the photographic film, and an associated tracking mechanism which constrains movement of the camera to an arcuate path centered around a point in the scene to be photographed. During exposure, the camera is moved along the arcuate path defined by the tracking mechanism and the lenticular screen is shifted relative to the photograhic film by a total distance equal to one lenticule width. This requires precision movements of the various camera and tracking components, with attendant complexity of operation and construction. The apparatus moreover is quite bulky, which limits its usefulness for location photography. The direct process also necessitates exposure times of comparatively long duration, a rather severe limitation, and has the further disadvantage of lacking good depth of field. An additional drawback is that the final three-dimensional picture cannot be freely enlarged or reduced in size.

The indirect technique, by allowing the use of a conventional two-dimensional camera in photographing the object field or scene, eliminates most of the aforementioned drawbacks of the direct technique. Furthermore, recent developments by Lo and Nims relating to the manner of making the two-dimensional exposures, as described in copending, commonly-owned U.S. application Ser. No. 508,810 for "Methods and Apparatus for Taking the Composing Stereoscopic Pictures", filed Sept. 24, 1974, have significantly advanced the state of the art of the indirect technique. Limitations in the composing step have nevertheless continued to impede general usage of the indirect process. This has been due chiefly to the need to produce the final image-bearing sheet (composed of interdigitated lineiform images from the several two-dimensional views) separately from the viewing screen and thereafter to laminate it to the screen with the lineiform images and screen lenticules in precise alignment. Since the image-bearing sheets frequently change size between composing and laminating, as a result for example of fluctuations in ambient temperature, humidity, etc., such alignment of the image sheet and the viewing screen is quite laborious and costly and often cannot be satisfactorily attained. Efforts to apply mass production techniques to the alignment step, by means of litho or offset printing of the image sheet and forming the lenticular screen directly on the image sheet for instance, not only do not adequately eliminate alignment problems but create still other difficulties, such as poor color reproduction, further change of dimension of the image sheet, low density of printing inks, low resolution of the printed image and the like, which further impair the picture quality.

Attempts have been made to overcome the laminating and alignment problems of the indirect composing step by coating a photographic emulsion directly on the rear surface of a lenticular screen and using the "lenticular film" thus produced in composing the final three-dimensional picture from the projected two-dimensional images; that is to say, the lenticular film is used in place of the separate composing lenticular screen and photosensitive sheet. The two-dimensional views are projected sequentially or simultaneously through the lenticular screen to expose the photosensitive emulsion beneath the lenticules. A rudimentary composing system of this nature is described by N. A. Valyus at pages 203–205 of "Stereoscopy", the Focal Press, London W.1, England (1966); see also U.S. Pat. No. 3,482,913, granted Dec. 9, 1969, to W. E. Glenn, Jr. Although avoiding laminating and alignment problems, the prior art indirect composing procedures employing lenticular print film have failed to overcome other problem areas in the composing step. For example, autostereoscopic pictures thus produced have heretofore had limited viewing angles and distances owing to the necessity of viewing the lenticular screen from the same distance and position that the two-dimensional frames were projected during composing. This seriously detracts from the quality of the final picture. It is necessary with known print film composing systems and processes, moreover, to make individual adjustments of the composing system components, such as the distance between enlarging lenses, the projection distance, etc., in order to obtain acceptable sharpness in the three-dimensional picture. Often this is not properly done, with resultant loss of picture quality, and in any event is a costly, time consuming operation. Such adjustments are required, for instance, every time the distance between the camera and the center of interest of the object field, i.e., the element or point to appear in the plane of the three-dimensional picture, is changed. As is developed in detail hereinafter, this necessity compels a substantial number of interrelated adjustments. Heretofore the prior art has neither comprehended the full nature of these adjustments nor provided an effective way of avoiding them or of implementing them in a simplified and reliable manner. The end result has been that the prior art has failed to provide indirect composing apparatus and procedures which are capable of producing high quality autostereoscopic pictures with efficiency and cost factors permissive of widespread commercial application of the technique.

The foregoing and other requirements of the prior art are fulfilled by the present invention.

SUMMARY OF THE INVENTION

In accordance with the invention, the relationships between the taking and composing steps required to produce high quality stereoscopic pictures by use of the indirect technique are established and novel and advantageous forms of apparatus embodying these relationships are provided. The result is an overall integrated system wherein the various components of the taking step and the composing step, i.e., the camera, the enlarger, and the lenticular screen, are so constructed and arranged, both individually and in relation to one another, as to afford marked advantages relative to prior art systems in respect of picture quality and economy.

One embodiment of a camera constructed in accordance with the invention includes a plurality N of lenses for taking a corresponding plurality N of two-dimensional views of an object field. The lenses are arranged in a straight path and are equidistantly spaced apart with their optical axes in parallel. Means are provided for adjusting the spacing between the lenses as a function of the distance from the lenses to the key subject matter element of the object field so as always to record the image of that element at a particular location on each two-dimensional view. The camera may be either of the adjustable-focus type or the fixed-focus type. In the former case, adjustment of the spacing between lenses is carried out concurrently with focusing of the lenses. This adjustable lens feature enables the spacing between the locations from which the respective two-dimensional views are projected during the composing step to be fixed irrespective of variation in the distance from the camera to the selected element of the object field, thereby eliminating many of the costly and time consuming adjustment steps required in prior art systems. Preferably, the spacing between adjacent projection locations is selected as a function of the parameters of the lenticular screen so as to provide a proper image structure in the stereoscopic picture. Specifically, the projecting lens spacing should be such that the N condensed images formed beneath each lenticule are spaced apart by substantially w/N.

Advantageously, though not necessarily, the spacing between adjacent projecting lens locations is also such that the required separation of the key subject matter element images on adjacent two-dimensional views in the projection apparatus is the same as the spacing between adjacent image locations in the camera. If so, the film may be taken from the camera and, after developing, placed directly in the projection apparatus without the necessity of cutting the film to adjust the spacing of the individual views.

According to the invention, the composing apparatus includes structure for changing the angle of projection of each two-dimensional view by a predetermined amount during the projection thereof. This provision allows the area behind each lenticule to be completely filled with condensed images of the object field without at the same time requiring an extremely large number of two-dimensional views. As mentioned, the projecting lens locations preferably are equidistantly separated by a distance such that N condensed images behind each lenticule of the lenticular screen will be spaced apart by substantially w/N. The angle of projection of each two-dimensional view would in this instance be changed by an amount sufficient to expand the width of the individual condensed images to substantially w/N. Each lenticule would thus be filled with N condensed images, each corresponding to an element of each two-dimensional view and each substantially w/N in width. Suitably, all N two-dimensional views are projected simultaneously, with the changing of the angle of projection of all views likewise being carried out simultaneously.

Where simultaneous projection of the N two-dimensional views is to be effected, a like plurality N of projection lenses is provided. Alternatively, a single projecting lens which is moved sequentially to each of the projecting lens locations can be used. This latter construction is particularly useful where the required distance between adjacent key subject matter element image locations in the composing apparatus is greater than corresponding distance in the camera or where the two-dimensional views are taken using a conventional single-lens camera which is moved from vantage point to vantage point.

BRIEF DESCRIPTION OF THE DRAWINGS

For a better understanding of the invention, reference may be made to the following description of exemplary embodiments thereof, taken in conjunction with the figures of the accompanying drawings, in which:

FIGS. 10A, 10B and 10C illustrate three forms of apparatus for scanning the projected images from the two-dimensional film frames along the photosensitive surface of the lenticular film.

DETAILED DESCRIPTION

Basic Indirect Process

As alluded to above, the indirect process as practiced in the prior art includes basically two distinct steps, a photographing or taking step and a composing step. These steps are illustrated diagrammatically in FIG. 1 in the context of the overall indirect process. In the taking step, a series of two-dimensional views of an object field, including for example the elements A, K and B (shown for simplicity in a straight line), are taken from a corresponding number of photographic vantage points aligned transversely of the object field. The different photographic vantage points may be established by arranging a number of equidistantly spaced cameras of substantially identical optical characteristics along a path perpendicular to the optical axes of the cameras.

Figure 1:
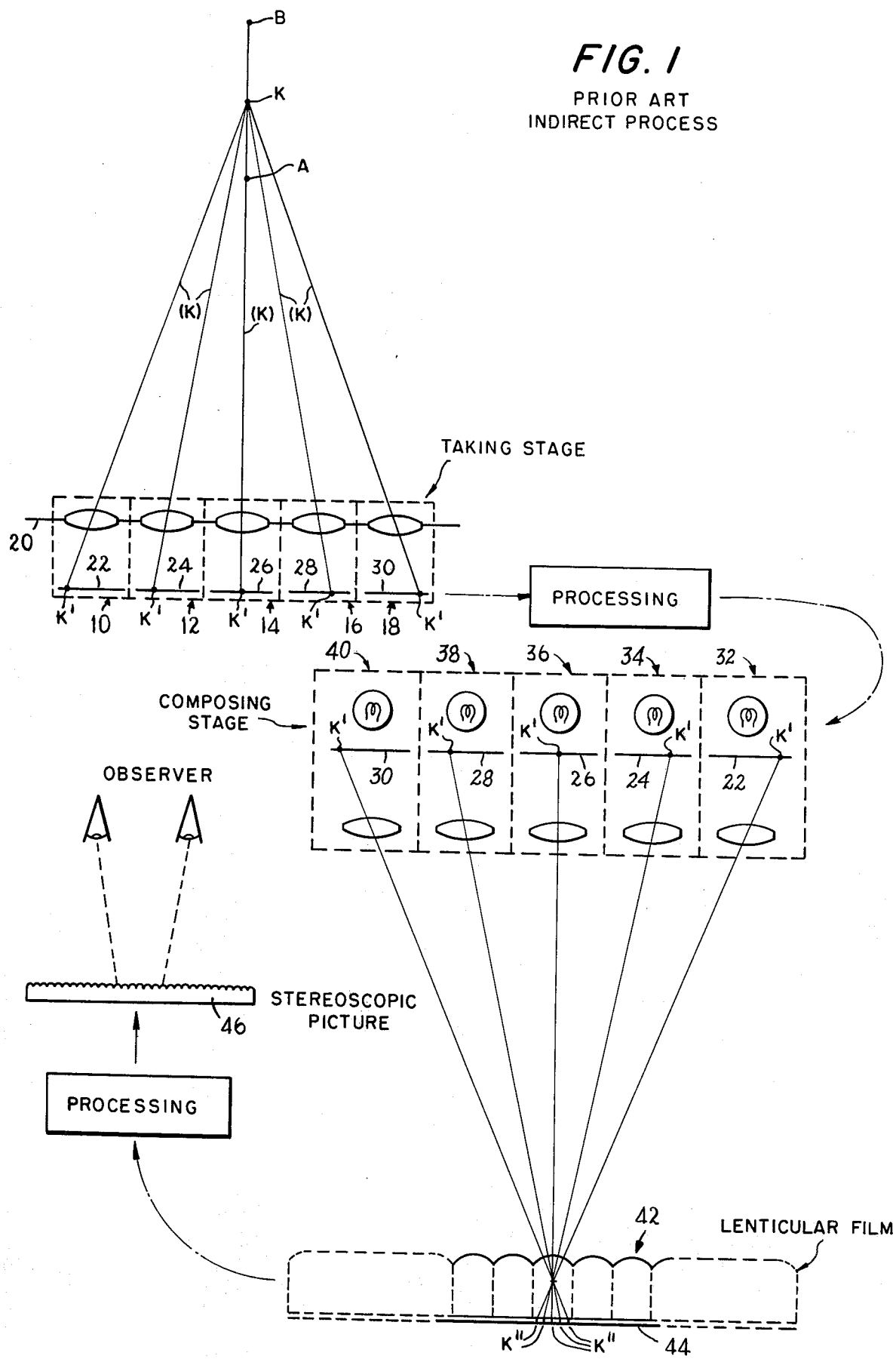
FIG. 1 is a diagrammatic view of the overall indirect process for the production of stereoscopic pictures, as practiced in the prior art.

Alternatively, a single camera may be moved from vantage point to vantage point relative to the object field (or the object field moved relative to a stationary camera), or a single camera having a number of objectives may be used. An illustrative camera arrangement, therefore, might take the form illustrated in FIG. 1, with five individual cameras 10, 12, 14, 16 and 18 positioned along a straight path 20 and centered relative to the object field elements A, K and B. Upon exposure, the cameras 10–18 produce on the corresponding film frames 22, 24, 26, 28 and 30, respectively, latent images of the object field elements A, K and B. For clarity, only the images K' produced by the central light rays (K) are depicted in FIG. 1. The frames 22–30 are then suitably processed (developed, trimmed, etc.) for use in the composing step.

The processed frames (negatives or positives) 22–30, bearing the developed images K', are placed in a corresponding number of projectors 32, 34, 36, 38 and 40 which are independently adjustable for control of magnification and for alignment of corresponding images of a selected object field element from the several negatives. The particular images selected for registration during composing will determine the object field element that will appear to lie in the plane of the stereoscopic picture. Assuming in FIG. 1 that this is to be the element K, the projectors 32–40 are shifted relative to one another until the projected K' images are aligned with a common point on the lenticular print film 42. Any necessary adjustment to establish commonality of magnification among the projectors 32–40 is also carried out. Thereafter, the projectors are turned on and lineiform images K'' corresponding to the K' images from the frames 32–40 are formed on the photosensitive layer 44 of the lenticular film 42 in the well known manner. By virtue of the prior alignment of the projected K' images, all of the K'' lineiform images will be formed beneath the same lenticule of the film 42, and indeed such registry of the projected K' images is necessary if sharp stereoscopic pictures are to be obtained.

Finally, the exposed lenticular film is suitably processed to provide the final stereoscopic picture 46 which, upon viewing, affords to the observer an overall view of the object field in relief.

Although, as previously noted, the foregoing indirect process obviates certain of the difficulties encountered with still earlier stereoscopic procedures, it has heretofore not been susceptible of widespread commercial use, owing largely to cost and quality limitations arising from the composing step. The nature and extent of these limitations may be appreciated from an analysis of the photographic and optical parameters of the indirect process.

OVERALL INDIRECT SYSTEM

Figure 2:
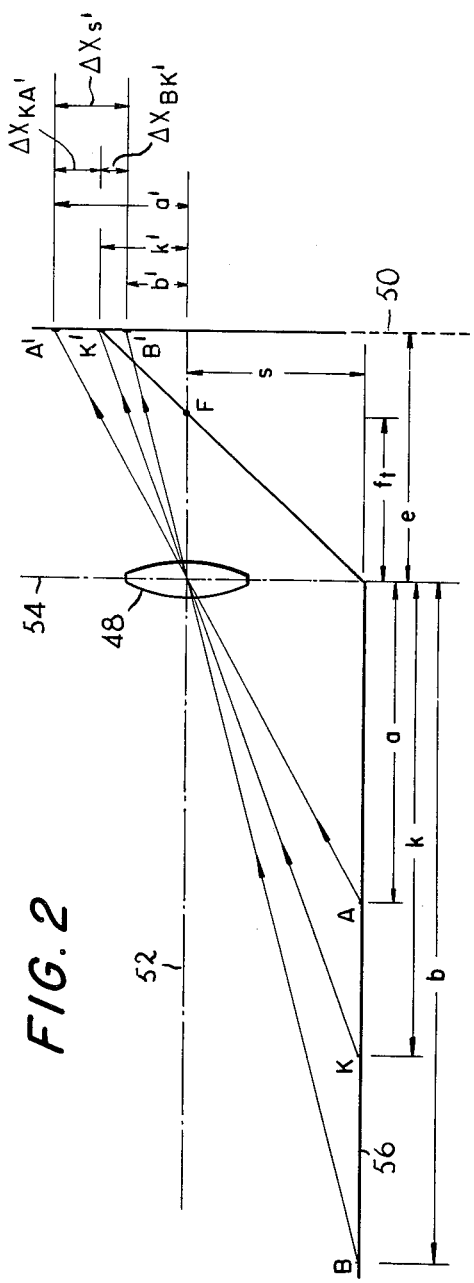
FIG. 2 illustrates certain basic relationships between the elements of a photographic scene and the images of those elements formed by a photographic lens.

By reference to FIG. 2, wherein a single taking lens or camera location (vantage point) is represented by the lens 48, certain basic relationships of the taking step can be established. As before, the object field elements to be photographed are designated A, K and B and the images of those elements formed by the lens 48 on the film plane 50 are designated A', K' and B', respectively. The thin lens 48 is representative of the composite objective lens system of an actual camera, having an optical axis 52. The line 54 indicates the path of alignment of the taking lenses or of movement of the camera relative to the object field, as drawn through the optical center of the lens system. For convenience, it is also assumed that the objects A, K and B are arranged in a straight line 56 parallel to and spaced a distance $s$ from the optical axis 52 of the lens 48 and that element K constitutes the "key subject matter" of the field, i.e., the element of the field whose image is to appear in the plane of the final stereoscopic picture, and hence the element on which the camera is focused. Element A will thus appear to be in the foreground of the final picture and element B in the background.

By simple trigonometric relations, it may be seen that:

$$e = \frac{kf_t}{k-f_t} \qquad (1)$$

$$k' = \frac{se}{k} = \frac{sf_t}{k-f_t} \qquad (2)$$

$$a' = \frac{se}{a} = \frac{k}{a}k' \qquad (3)$$

$$b' = \frac{se}{b} = \frac{k}{b}k' \qquad (4)$$

where:
- $e$ is the distance from the objective plane to the film plane;
- $f_t$ is the focal length of the taking lens;
- $a$, $k$ and $b$ are the distances from the objective plane to the object field elements A, K and B, respectively; and
- $a'$, $k'$ and $b'$ are the distances along the film plane 50 from the lens axis 52 to the images A', K' and B', respectively.

Equations (1)–(4) are applicable to all photographic vantage points, i.e., to all taking lens or camera positions.

The characters $\Delta X_{KA'}$ and $\Delta X_{BK'}$ in FIG. 2 represent the changes over the distance $s$ in parallax, or parallax values, along the film plane 50 between the key subject matter element image K' and the foreground element image A', on the one hand, and between the key subject matter element image K' and the background element image B', on the other. $\Delta X_{s'}$ is the total parallax value change over the distance $s$. As is explained fully in the aforementioned U.S. application Serial No. 508,810 and as referred to further hereinafter, the values of $\Delta X_{s'}$, $\Delta X_{KA'}$ and $\Delta X_{BK'}$ are controlled within limits, with $\Delta X_{KA'}$ and $\Delta X_{BK'}$ preferably made equal for optimum clarity and relief effect in the stereoscopic picture.

Having established the foregoing taking-step relationships, it is important to ascertain the interdependence of the taking and composing steps. These further relationships may be determined from FIG. 3, wherein, for clarity, the separate taking and composing steps are diagrammatically combined. The order of the two-dimensional views in the composing step of FIG. 3 is thus the reverse of what it actually would be in practice.

Figure 3:
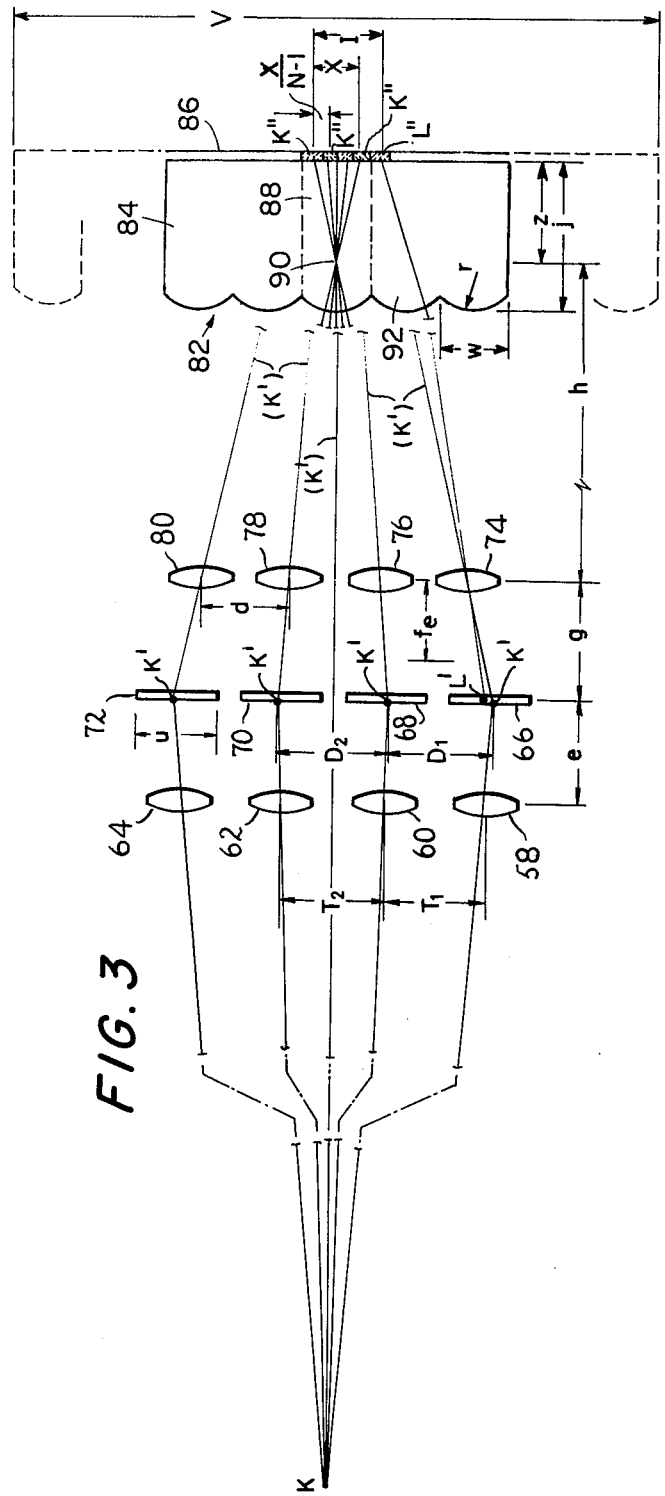
FIG. 3 is a diagrammatic representation showing the relationships between the taking and composing steps of the indirect process.

In FIG. 3, the taking step illustratively embodies four objectives 58, 60, 62 and 64 and four corresponding film frames 66, 68, 70 and 72. Again, to avoid undue complexity, only the key subject matter element K of the object field is shown. Upon exposure, the lenses 58–64 form latent images K', together of course with images (not shown) of all other object field elements within the fields of view of the lenses, on the respective frames 66–72.

The composing step, then, includes a like number of enlarging (projecting) lenses 74, 76, 78 and 80 for projecting the K' images, etc., onto the surface of a lenticular print film 82. The lenticular film 82 is composed of the usual planoconvex lenticular screen 84 having coated on its base (the focal plane of the screen) a photosensitive emulsion layer 86. The composing screen and photosensitive layer could be separate if desired, or they could be formed separately and bonded or otherwise affixed together prior to exposure. As is well known, the lenticular screen 84 condenses the projected K' images from the respective frames 66–72 into a corresponding plurality of lineiform images K'' on the photosensitive layer 86 which, when the frames and enlarging lenses are properly arranged, will be substantially equidistantly spaced beneath a single lenticule 88 of the screen 84. Upon viewing the developed lenticular film 82 through the screen 84, therefore, an observer will see a different lineiform image K'' with each eye, each of which K'' images will depict the key subject matter element K from a different photographic vantage point. If all of the K' images from the frames 66–72 are projected in registry with a common reference point, the central projected rays (K') will pass through the center of curvature 90 of the same lenticule 88. The key subject matter element K will then appear to lie in the plane of the stereoscopic picture. Images of elements in the foreground and background of the object field, however, will not be projected in registry and will therefore be recorded beneath different lenticules of the screen 84. Hence, the observer will perceive those objects as being either in front of or behind the key subject matter element, as the case may be, and consequently will appear to see the overall image of the object field in dimension.

FIG. 3 of course depicts the positional relationships between the key subject matter element K, the taking lenses 58–64, film frames 66–72, the enlarging lenses 74–80, and the lenticular film 82 when all of those components are properly arranged to form on the photosensitive layer 86 all of the key subject matter element images K'' beneath the same lenticule 88 and spaced across substantially the full width of and symmetrically within the lenticule. If this arrangement is not substantially achieved, loss of quality in the final picture, e.g., blurred images, limited viewing angle, unsatisfactory three-dimensional effect, etc., results. But the precise arrangement of object field elements, taking components and composing components portrayed in FIG. 3 rarely exists in practice, necessitating the aforementioned complicated and laborious adjustments during the composing step. Moreover, the prior art has not fully comprehended the nature and interdependency of the adjustments which must be made. In accordance with the present invention, the relationships (derived below) existing between the various components when properly arranged (as in FIG. 3) are utilized to provide improved taking and composing techniques and apparatus which overcome the limitations of the prior art.

Returning to FIG. 3 and considering for convenience only the lenses 58, 60 and 62, the center-to-center spacing between lenses 58 and 60 is designated $T_1$, the center-to-center spacing between lenses 60 and 62 is designated $T_2$, and the spacings between the corresponding K' images on frames 66, 68 and 70 are designated $D_1$ and $D_2$, respectively.

By trigonometric relations it may be demonstrated that:

$$D_1 = T_1 \frac{k+e}{k}, \text{ and} \quad (5)$$

$$D_2 = T_2 \frac{k+e}{k} \quad (6)$$

Where the lenses 58, 60 and 62 are equidistantly spaced, $T_1$ equals $T_2$ and $D_1$ equals $D_2$. Hence, the spacing between the K' images on adjacent frames is equal among all of the frames 66–72 when the taking lenses 58–64 are equidistantly spaced. This relationship exists as to the images of all object field elements in the same plane as the element K, i.e., all such co-planar images will be spaced apart by the same distance $D_K$. Accordingly, a general expression for the distance between the images on adjacent frames of corresponding object field elements co-planar with the element on which the taking lenses are focused, where the taking lenses are equidistantly spaced apart by the distance T, may be derived from equations (1) and (5) or (6) as:

$$D_{K'} = T \frac{k+e}{k} = T \frac{k}{k-f_t} \quad (7)$$

Similarly, the spacings between the adjacent images of any foreground object element, e.g., element A in FIG. 1, or any background object element, e.g., element B in FIG. 1, and of any other object field elements in the same planes, can be expressed as:

$$D_{A'} = T + T \left[\frac{f_t}{k-f_t}\right] \frac{k}{a} \quad (8)$$

$$D_{B'} = T + T \left[\frac{f_t}{k-f_t}\right] \frac{k}{b} \quad (9)$$

Turning briefly to the lenticular film 82, the pertinent parameters of the lenticules, according to well known lenticular lens theory, are as follows:

$$z = j/n \quad (10) \qquad P = \frac{1}{w} \quad (12)$$

$$r = \frac{j(\frac{n-1}{n})}{n} \quad (11) \qquad \theta = 2\arctan\frac{nw}{2j} \quad (13)$$

where:
 $j$ is the thickness of the lenticules;
 $n$ is the index of refraction of the screen material;
 $r$ is the radius of curvature of the individual lenticules;
 P is the number of lenticules or lines per inch;
 $\theta$ is the viewing angle of the lenticules;
 2 is the distance between the center of curvature of the lenticules and the focal plane of the screen; and
 $w$ is the width of an individual lenticule.

Considering now the composing step, it can be established that the distance $g$ between the plane of the enlarging lenses 74–80 and the plane of the frames 66–72, the distance $h$ between the enlarging lens plane and the lenticular film 82 (actually the plane of the centers of curvature of the lenticules), the center-to-center spacing $d$ between adjacent enlarging lenses, the focal length $f_e$ of the enlarging lenses, the size $u$ of the useful image area of one of the frames in a direction perpendicular to the lengthwise extent of the lenticules of the film 82, and the corresponding size $v$ of the final stereoscopic picture, are related as follows:

$$\frac{h+z}{g} = v/u \qquad (14)$$

Typically, $h$ will be very much greater than $z$, so that in effect $$h/g = v/u \qquad (15)$$

Equation (15) gives the magnification factor or enlargement ratio, hereinafter termed R, of the enlarging system.

Moreover, $g$ and $h$ are also constrained with $f_e$ in accordance with:

$$\frac{1}{g} + \frac{1}{h} = \frac{1}{f_e}, \text{ or}$$

$$g = \frac{hf_e}{h - f_e} \qquad (16)$$

Hence, by combining equations (15) and (16), $h$ may be expressed in terms of the focal length $f_e$ of the enlarging lenses and the enlargement ratio R:

$$h = f_e(R + 1) \qquad (17)$$

For the combined taking-composing condition of FIG. 3, i.e., where the taking lenses 58–64, the frames 66–72 and the enlarging lenses 74–80 are all arranged so as to register each of the K' images with a common reference point, the respective spacings $d$ and D of the enlarging lenses and K' images are related according to:

$$d = \frac{Dh}{g + h} \qquad (18)$$

Incorporating equations (7) and (18):

$$d = T \frac{1 + e/k}{1 + g/h} \qquad (19)$$

It is apparent from equation (19) that even where $e$ of the camera and $g$ and $h$ of the enlarging system are held constant, the required spacing $d$ of the enlarging lenses will still vary with the photographic distance $k$ to the key subject matter element K and the spacing T of the taking lenses. In normal photographic usage, $k$ is of course almost infinitely variable. For widespread application of the indirect technique, therefore, appropriate provision must be made to take this factor into account in a rapid yet reliable and economic manner.

It may further be demonstrated from consideration of FIG. 3 that the optimum lenticule width $w$ of the lenticular screen 84 also varies as a function of the enlarging lens spacing $d$ and hence of the photographic distance $k$. Desirably, when a stereoscopic picture is viewed through the viewing screen there should be no discontinuities or interruptions in the overall image of the object field (resulting, for example, from gaps between adjacent lineiform images or from overlapping lineiform images) presented to the observer regardless of the position from which he views the picture. That is to say, the images of corresponding elements from the respective two-dimensional frames condensed beneath each lenticule should just fill up the area beneath the lenticule without overlapping. The relationships productive of this image arrangement may be seen by reference to FIG. 3 and by consideration of the lineiform images of the key subject matter element K and of other elements in the same plane as the element K.

In FIG. 3, the distance spanned by the images K'' beneath the lenticule 88 is given by $$x = zd \frac{N - 1}{h} \qquad (20)$$

where:

N is the number of two-dimensional frames.

Then, let L' represent the element image on the frames (shown only on frame 66 in FIG. 3 for clarity) which is focused through the lenticule 92 next to lenticule 88 so as to form thereunder the lineiform image L''. The spacing I between the K'' image and the L'' image from the same frame, e.g., frame 66, is given by:

$$I = w \frac{(1 + z)}{h} \qquad (21)$$

To avoid image discontinuities and overlapping in the composed stereoscopic picture, each lineiform image on the photosensitive surface 86 ideally will occupy a distance $x/(N-1)$. The preferred value of I would thus be:

$$I = N \frac{x}{N-1} \qquad (22)$$

The optimum lenticule width $w$ is then that $w$ which satisfies equation (22). This can be had by combining equations (20), (21) and (22):

$$\frac{w(1 + z)}{h} = Ndz/h$$

and, since $h$ is much greater than $z$, for practical purposes:

$$w = Ndz/h = Ndj/nh \qquad (23)$$

It may be appreciated that if $w$ is selected according to equation (23), the entire area of the lenticular film will be filled with lineiform image elements which are contiguous but which do not overlap, and that a continuous uninterrupted view of the object field will thus be presented to the observer. However, it follows from equations (23) and (19) that the optimum value of $w$ varies with $d$, and thus with $k$, so that it is not only necessary to account for the change in $d$ occasioned by change in $k$, but to account as well for the accompanying change in the required value of $w$. Otherwise, the lineiform images K'', etc., will not be properly placed to provide the desired uninterrupted picture configuration.

Although for purposes of illustration the individual K'' and L'' lineiform images are shown in FIG. 3 as fully covering the distance I/N (i.e., w/N), these images are in fact well focused and condensed by the enlarging lenses and the lenticular screen. In the usual case, they are in reality very narrow line ("lineiform") images of considerably less width than that depicted in FIG. 3. To avoid discontinuities between lineiform images, therefore, it is desirable to expand or scan the individual lineiform images over the distance $x/N-1 - m$, where $m$ is the width of each unexpanded lineiform image. As one feature of the invention, methods and apparatus are provided for this purpose, as is described hereinafter. Also, it is possible to select the parameters of the lenticular screen and to arrange the enlarging system such that stereoscopic pictures of acceptable quality are provided without expansion of the individual lineiform images. Generally, therefore, the invention affords improved apparatus and methods for implementing the indirect process whether or not image expansion is utilized in the composing stage, although for maximum advantage it preferably is.

Adjustable Camera

The invention provides, as one way of overcoming the aforementioned prior art limitations, a multi-lens camera in which the focus and spacing of the lenses are simultaneously adjusted so as always to maintain the proper image relationship among the several film frames for allowing composing of a stereoscopic picture to be carried out without necessitating adjustment of the enlarger components or of the lenticular film parameters regardless of change in the photographic distance $k$. That is to say, the camera permits the photographer to focus on any object field element of his choice without requiring adjustment or redesign of the enlarging-lenticular film system for each individual value of the photographic distance $k$.

Figure 4:
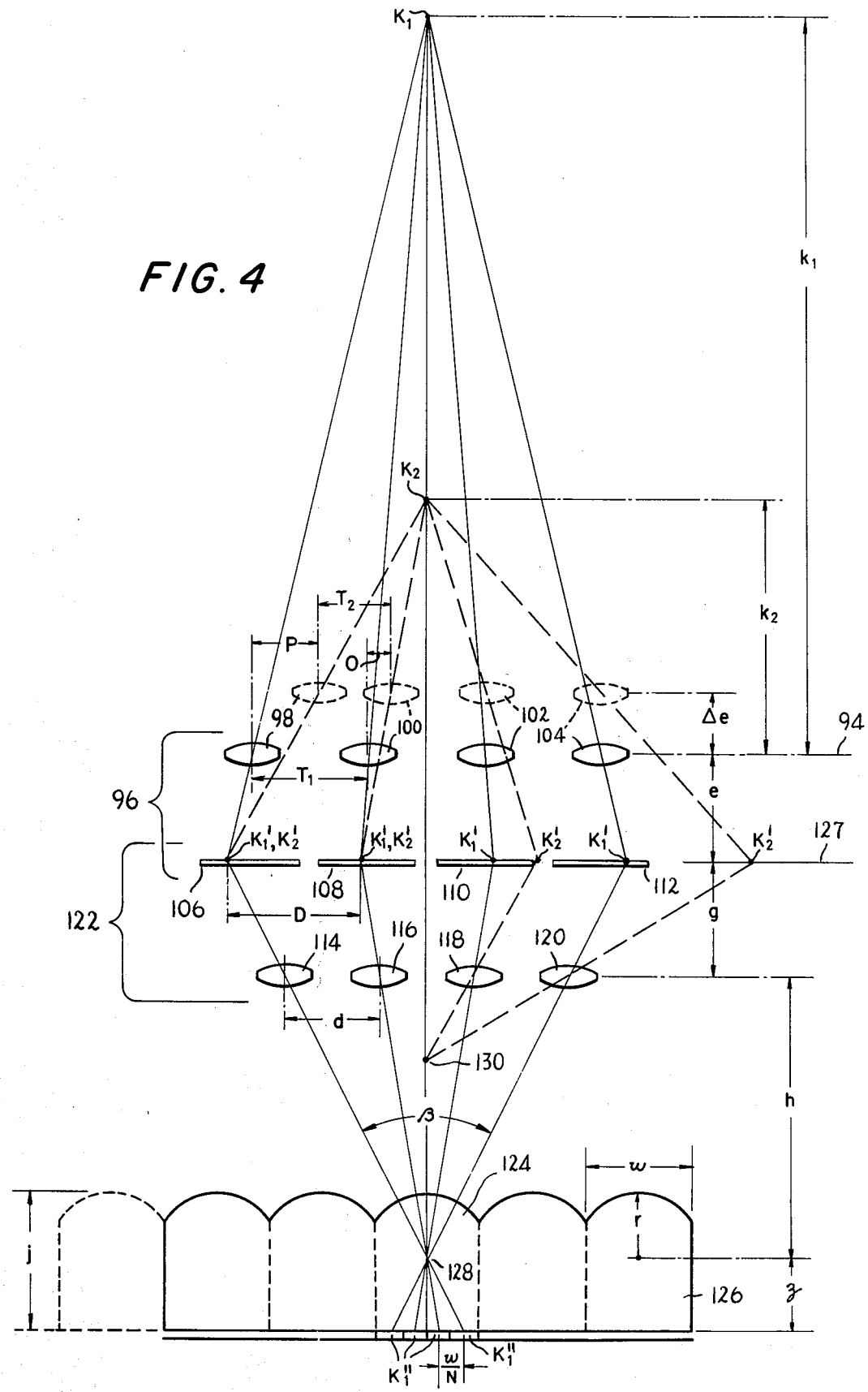
FIG. 4 is a further combined representation of the taking and composing steps and also illustrating the effect of change in photographic distance on the relationships between the various taking and composing components.

The manner in which this is accomplished is portrayed in FIG. 4, which also illustrates the consequences of failure to make such adjustment of the camera lenses.

In FIG. 4, $K_1$ is a key subject matter element located a distance $k_1$ from the objective plane 94 of a camera 96 including, illustratively, four objectives 98, 100, 102 and 104 centered on the element $K_1$. It is assumed that with the objectives 98–104 in the positions indicated in solid in FIG. 4, the camera 96 is focused on the element $K_1$ so as to form on the film frames 106, 108, 110 and 112 sharply focused images $K_1'$ of that element. As previously shown, if the objectives 98–104 are uniformly spaced by a distance $T_1$, the images $K_1'$ on the film frames 106–112 will be uniformly spaced apart by a distance D. The enlarging lenses 114, 116, 118 and 120 of the enlarger 122 will then be correspondingly spaced apart by a distance $d$ so as to form the lineiform images $K_1''$ evenly over the width $w$ of a lenticule 124 of the lenticular film 126, as previously explained. In accordance with the invention, all components from the frames 106–112 on back are held in fixed position regardless of variation in the photographic distance $k$; that is to say, the parameters of the enlarger-lenticular film system, e.g. $d$, $g$, $h$, $w$, $r$, $z$ and $j$, remain constant regardless of change in the photographic distance $k$, thereby eliminating the troublesome adjustments heretofore found necessary in the composing step.

It is clear from inspection of FIG. 4 that in order for the enlarger-lenticular film system to be, in effect, standardized in this way, the images K' of the key subject matter element (the projected images which are to be held in registry during enlargement) must always be recorded at the same locations on the respective two-dimensional frames 106–112. This in turn requires certain adjustments in the camera 96, the nature of which may be more fully appreciated by consideration of what happens when the photographic distance $k$ is changed without such adjustments being made.

Assuming the camera is to be focused on an object field element $K_2$ (see FIG. 4) spaced a distance $k_2$ from the objective plane 94, it may be seen that the objectives 98-104 will have to be moved a distance $\Delta e$ (greatly exaggerated for clarity) from the plane 94 in which they were located when focused on element $K_1$ in order to bring the images of the element $K_2$ into sharp focus on the film plane 127. If $e$ alone is changed, however, the images $K_2'$ of the element $K_2$ (considering now only the right hand frames 110 and 112 and assuming both are large enough to receive the $K_2$ images) will not fall on the same locations on the frames 110 and 112 as did the images $K_1'$. Hence, they will not be in the proper positional relationship relative to the enlarging lenses 118 and 120 for registry with the center of curvature 128 of the lenticule 124 and will be projected instead through the point 130. This departure from the correct locations of the $K_2'$ images may be avoided, according to the invention, by adjusting the spacing T between adjacent objectives 98–104 of the camera 96 in correspondence with the adjustment in $e$. This further adjustment is illustrated in the left hand side of FIG. 4.

Assuming again that the camera is to be focused on $K_2$ and the objectives 98 and 100 are moved forward by $\Delta e$ to bring the images $K_2'$ of that element into sharp focus on the frames 106 and 108, it will be appreciated that in order to form the images $K_2'$ at the same locations on the film frames 106 and 108 as were the $K_1'$ images the spacing between the objectives 98 and 100 must be changed from $T_1$ to $T_2$. In other words, the objectives 98 and 100 must be moved from the positions shown in solid to the positions shown in dashed lines in the left hand side of FIG. 4. The distances by which the objectives 98 and 100, and the correspondingly located objectives 102 and 104, must be moved may be appreciated from consideration of equation (19):

$$d = T \frac{1 + \frac{e}{k}}{1 + \frac{g}{h}} \qquad (19)$$

With a fixed enlarging system, $g$, $h$ and $d$ are constant regardless of variation in $k$. Hence, for all values of $k$ the quantity $T(1 + e/k)$ must also be constant. As $K \to \infty$, the quantity $T(1 + e/k)$ also $\to T_\infty$, so that for $T_\infty$ equation (19) becomes:

$$d = T_\infty(1 - f_e/h) = \frac{T_\infty}{1 + g/h} \qquad (24)$$

Since $d$ remains constant for all values of T, the taking lens spacing T may be expressed, combining equations (19) and (24), as follows:

$$T = \frac{T_\infty}{1 + e/k} = \frac{T_\infty k}{k + e} \qquad (25)$$

Then if the change $\Delta T$ in lens spacing is defined as $T_\infty - T$:

$$\Delta T = T_\infty \frac{e}{k+e} = T_\infty \frac{f_t}{k} \quad (26)$$

and the several taking lenses must be moved accordingly to effect the necessary change in T. For example, in FIG. 4, where there are four lenses 98–104, and assuming that the distance $k_1 = \infty$ so that $T_1 = T_\infty$, the distance $o$ by which the objectives 100 and 102 must be moved (in opposite directions) is $\Delta T/2$ and the distance $p$ by which the objectives 98 and 104 must be moved is $3\Delta T/2$. The distance of movement of the individual taking lenses is of course dependent upon the number of lenses employed in the camera and their locations relative to the center line of the lens array. In any event, the spacing T between adjacent lenses is changed in correspondence with the change in $k$ and the change in $e$ so as always to form the images K' of the object field element K on which the camera is focused at the same locations on the film frames, thereby always maintaining the images K' in the proper positional relationship relative to the enlarging lenses for correct composing.

Considering now $\Delta e$ with more particularity and recalling equation (1), it will be appreciated that even for short photographic distances, e.g. $k = 4$ feet, $k$ will be much greater than $f_t$, e.g. 25 mm, and therefore that:

$$e \simeq f_t(1 + f_t/k) \simeq f_t + f_t^2/k \quad (27)$$

Since $e = f_t$ when $k = \infty$, the change $\Delta e$ from the smallest value $e_\infty$ to some larger value $e$ required in order to focus an object field element at a distance $k$ on the film plane of the camera is:

$$\Delta e = e - e_\infty \simeq f_t^2/k \quad (28)$$

Hence, adjustment of the camera lenses both for focus ($\Delta e$) and for horizontal spacing ($\Delta T$) in accordance with variation in photographic distance $k$ to the object field element focused on may readily be achieved by means of any convenient mechanical implementation of equations (26) and (28). Advantageously, though not necessarily, both adjustments are carried out simultaneously, as for example through a mechanism linked to the rangefinder of the camera. Representative apparatus for this purpose is illustrated in FIGS. 5 and 6.

Figure 5:
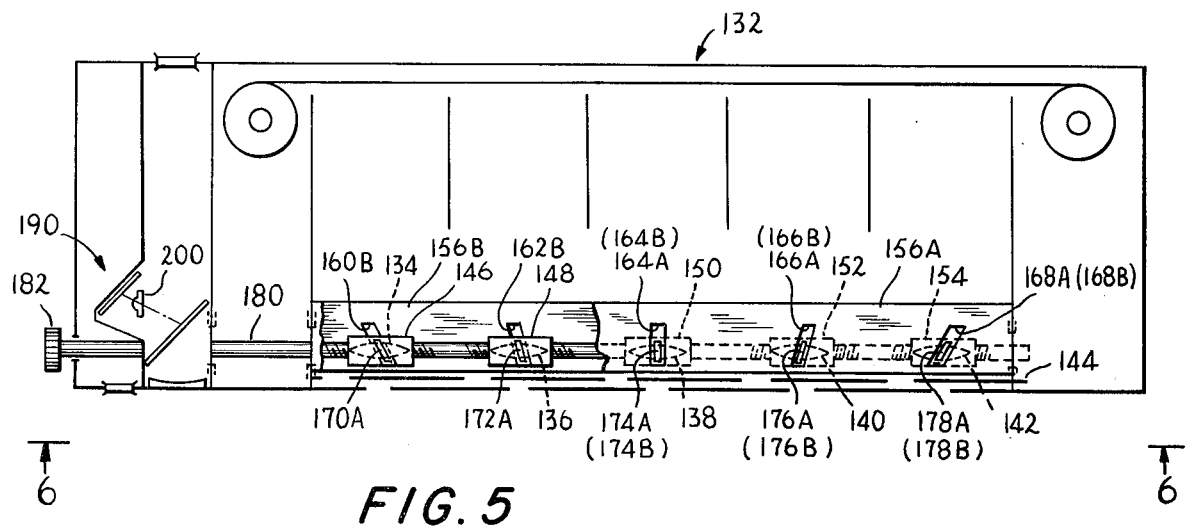
FIG. 5 depicts in plan an embodiment of a multi-lens adjustable-focus camera constructed in accordance with the invention.
Figure 6:
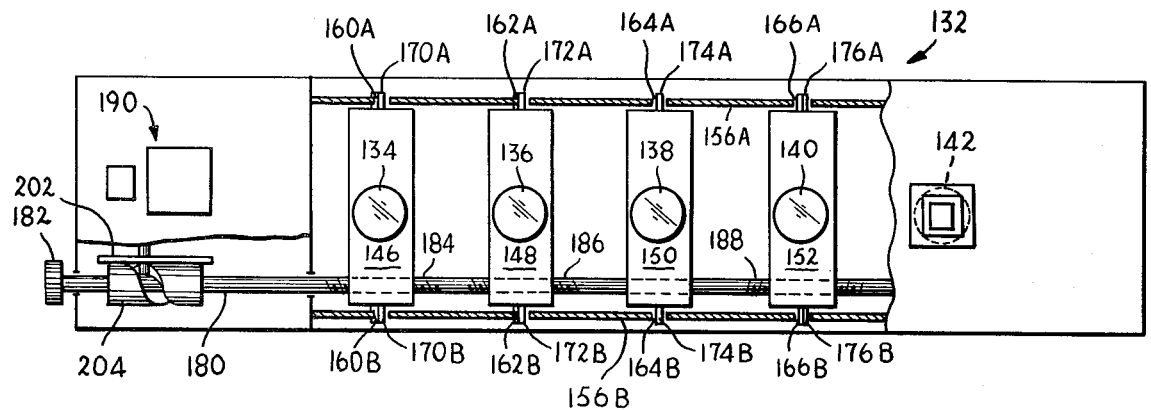
FIG. 6 is a vertical sectional view taken along the line 6—6 of FIG. 5.

FIGS. 5 and 6 depict in diagrammatic form a camera 132 including five objectives 134, 136, 138, 140 and 142 arranged with their optical axes parallel and their optical centers in a common plane. It will again be understood that the thin objective lenses illustrated are illustrative only and that composite lens systems would normally be employed. The camera may be provided with any appropriate film advance system for advancing five film frames into registry with the objectives 134–142. Likewise, the camera is provided with a suitable shutter system, indicated schematically at 144 in FIG. 5, which may for example be of the blade-type described in copending, commonly-owned U.S. application Ser. No. 379,387, filed July 16, 1973 for "Three-Dimensional Pictures and Method of Composing Them". Alternatively, individual shutters, preferably electronically controlled, may be provided. The shutter system in either case may be arranged to make all five exposures simultaneously or, as is described in the aforementioned application Ser. No. 379,387, to allow selective exposure of the several lenses.

The lenses 134–142 are individually carried by mounting blocks 146, 148, 150, 152 and 154, respectively, which, in accordance with the invention, are mounted within the camera 132 for movement both in the plane of the lenses and perpendicular to the plane of the lenses. To that end, the blocks 146–154 are captured between an upper cam plate 156A and a lower plate 156B which are fixed to the camera housing. The cam plates 156A and 156B are formed with vertically aligned cam slots 160A and 160B, 162A and 162B, 164A and 164B, 166A and 166B and 168A and 168B, and the lens mounting blocks 146–154 carry upper and lower lugs or cam followers 170A and 170B, 172A and 172B, 174A and 174B, 176A and 176B and 178A and 178B which are received within the corresponding cam slots 160A and 160B – 168A and 168B, respectively. As all of the lenses 134–142 move the same distance toward and away from the film plane and certain of the lenses move through different distances parallel to the film plane, the cam slots must be inclined accordingly. For example, for the five lens arrangement of FIGS. 5 and 6, wherein the endmost lenses 134 and 142 move laterally twice as far ($2\Delta T$) as the inner lenses 136 and 140 ($\Delta T$) and the center lens 150 does not move laterally at all, the endmost cam slots 160A and 160B and 168A and 168B are inclined relative to the objective plane at half the angle of inclination of the inner cam slots 162A and 162B and 166A and 166B. The central cam slot 164A is of course perpendicular to the objective plane.

Since the lenses 134 and 136 move in the opposite direction from that of lenses 140 and 142, the cam slots 160A and 160B and 162A and 162B are oppositely inclined relative to the cam slots 166A and 166B and 168A and 168B. Preferably, the lengths of the cam slots are such that their ends define the desired limits of travel of the lenses 134–142. These may readily be determined from equations (26) and (28) once $T_\infty$, $f_t$ and the minimum desired value of $k$ are selected. The inclination of the inner cam slots 162A and 162B and 166A and 166B needed to provide the appropriate incremental change in $e$ for each incremental change in T may be determined by solving each of equations (26) and (28) for $k$, equating them and rearranging the terms as:

$$\frac{\Delta e}{\Delta T} = \frac{f_t}{T_\infty} \quad (29)$$

The inclination of the endmost slots would then simply be half that of equation (29).

To effect the desired incremental changes in the camera focus and lens spacing with variation in the photographic distance $k$, each of the lens mounting blocks 146–154 is carried by an adjustment control rod 180 having at one end an adjustment control knob 182 for manipulation by the photographer. The endmost blocks 146 and 154 and the inner blocks 148 and 152 are threaded internally to receive correspondingly threaded portions of the rod 180. So that the endmost blocks 146 and 154 will be moved laterally twice as far as the inner blocks 148 and 152, the pitch of the endmost threaded portions 184 (only the left-hand portion is shown for clarity) is twice as great as the pitch of the inner threaded portions 186 and 188. The threaded portions on either side of the central lens 138 are of course of opposite lead. The central mounting block 150 is not threaded to the rod 180 but preferably is fitted closely thereto for rigidity. The thread pitches employed may be selected according to the fineness of the adjustment desired; e.g., the outer threaded portions may have a pitch of 1/28th inch and the inner two portions of 1/56th inch.

The adjustment control rod 180 is linked to the camera rangefinder, conveniently of the coincidence-type combined rangefinder-viewfinder. This may be done in any suitable manner well known in the art. For example, the movable element 200 of the rangefinder could be coupled through a cam plate 202 to a cam 204 carried by the control rod 180. This linkage would be arranged such that when the camera is focused at infinity the spacing T between lenses would be at the maximum and $e$ would be at a minimum, i.e., $T = T_\infty$ and $e = f_t$. Thus when the camera is focused on any object closer than infinity, by manipulation of the control knob 182 as governed by the rangefinder 190, the camera objectives 134–142 would be moved laterally and forward in accordance with equation (29) so as always to maintain the desired image positions on the respective film planes. It will be appreciated that wherever the rod 180 passes through a structural member of the camera housing, the housing will be appropriately slotted to accommodate forward and rearward movement of the rod.

Figure 7:
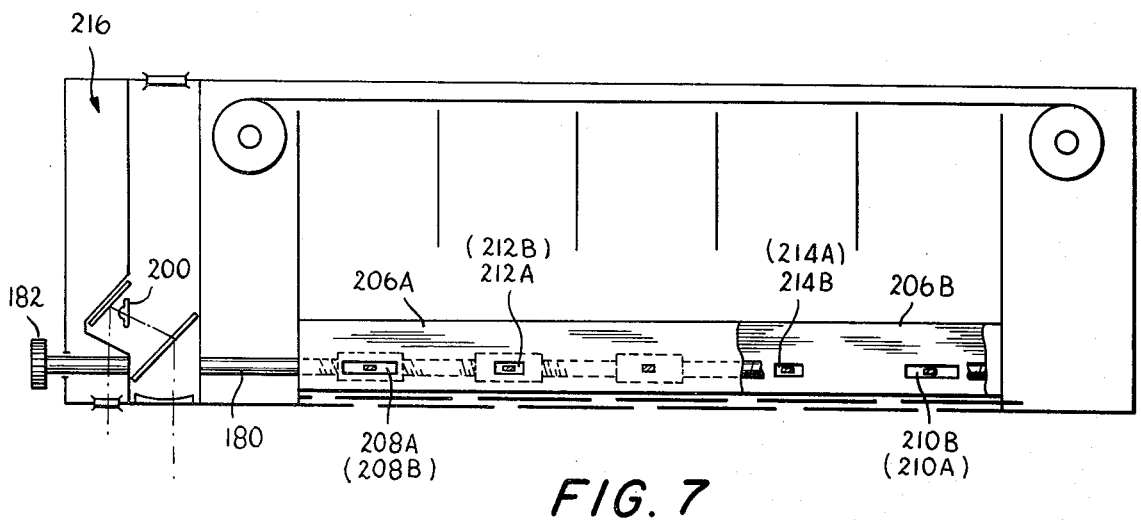
FIG. 7 is a plan view of a multi-lens fixed-focus camera constructed in accordance with the invention.

For simpler cameras in which focusing control over a range of photographic distances is not required, as for instance in a general usage snapshot-type camera having a comparatively short focal length lens, the focusing adjustment feature may be eliminated and the desired image relationship among the film frames maintained by control of lateral movement of the lenses alone. A fixed-focus camera of this construction is depicted in FIG. 7, and may generally be of the same construction as the camera of FIGS. 5 and 6 except that the cam slots for guiding movement of the lenses are oriented parallel to the objective plane of the camera. Thus, in FIG. 7, the upper cam plate 206A and the lower cam plate 206B are provided with endmost slots 208A and 208B and 210A and 210B of twice the lateral length of the inner cam slots 212A and 212B and 214A and 214B. In this case, the central lens is fixed against both lateral and focusing movement.

Since there is no change in $e$ in the FIG. 7 embodiment, $e$ being selected to focus the lenses at some preferred distance, say 10 ft, the total change $\Delta T$ in the lens spacing from $T_\infty$ to some smaller value of T corresponding to a photographic distance $k$ of less than infinity will be slightly smaller than in the embodiment of FIGS. 5 and 6. For the fixed-focus camera, $\Delta T$ becomes, modifying equation (26):

$$\Delta T = T_\infty \frac{f_t}{k + f_t} \qquad (30)$$

The endmost lenses in FIG. 7 would therefore be moved laterally a maximum of $2\Delta T$ from equation (30) and the inner lenses would be moved a maximum of $\Delta T$ from equation (30), and the cam slots 208A and 208B – 214A and 214B preferably are correspondingly sized and located relative to the calibration of the rangefinder 216 to define these limits of travel. The values of $\Delta T$ from equations (26) and (30) will be virtually the same for short focal length lenses or for comparatively long minimum $k$ distances, and equation (26) could be used in these circumstances both for the adjustable-focus and the fixed-focus cameras. At short key subject matter distances and/or with long focal length cameras, equation (30) will afford more accurate spacing control.

If, an illustrative value of $T_\infty$ for the adjustable-focus camera of FIGS. 5 and 6 is 22.0 mm and the minimum key subject matter distance $k$ of interest is taken to be 6 ft, values of $\Delta T$ and $\Delta e$ are (from equations (26) and (28) assuming $f_t$ is 25mm) 0.301mm and 0.342mm, respectively. The rangefinder linkage to the adjustment control rod 180 and the threaded connections between the rod and the lens mounting blocks would thus be designed to move the endmost objectives 134 and 142 through the lateral distance 0.602mm and the inner objectives 136 and 140 through the distance 0.301mm upon movement of the focusing control knob from the position corresponding to infinity to the position corresponding to 6 ft. Similarly, the cam slots 160A and 160B, 162A and 162B, 166A and 166B and 168A and 168B would be inclined relative to the objective plane so as to produce a corresponding change in $e$ from $e_\infty$ of 25mm to $e$ for 6 ft of 25.342mm, with incremental changes in $e$ and T over these maximum distances being related in accordance with equation (29).

For the fixed-focus camera of FIG. 7, a representative initial or maximum lens spacing $T_\infty$ may be 22.0mm. For this value, and again assuming an $f_t$ of 25mm and a minimum $k$ of 6 ft, the magnitude of $\Delta T$ from equation (30) is 0.297mm. The rangefinder and adjustment control rod 180 would in this case be linked to provide lateral movement of the endmost lenses over the total distance 0.594mm and of the inner lenses over the total distance 0.297mm, with appropriate incremental control thereover.

EXTENDED ENLARGER LENS SPACING

If it is desired to use a lenticular screen having a viewing angle greater than that which will be accommodated by the maximum permissible or desired camera lens spacing, or, for example, where a single lenticular film configuration is to be used with cameras having different lens spacings, a single-step projection system constructed generally in accordance with FIG. 4, but having an extended spacing $d$ between adjacent lenses, may be used. This is done by increasing the spacing $d$ by the distance necessary to satisfy equation (23) for the lenticular screen at hand.

Extension of the enlarger lens spacing in a multi-lens system such as that depicted in FIG. 4 of course necessitates a corresponding extension of the spacing D between adjacent film frames, as provided by equation (18). This may readily be accomplished by cutting the two-dimensional film strip and placing the individual film frames in the proper position relative to each enlarging lens.

SINGLE LENS ENLARGER

Figure 8:
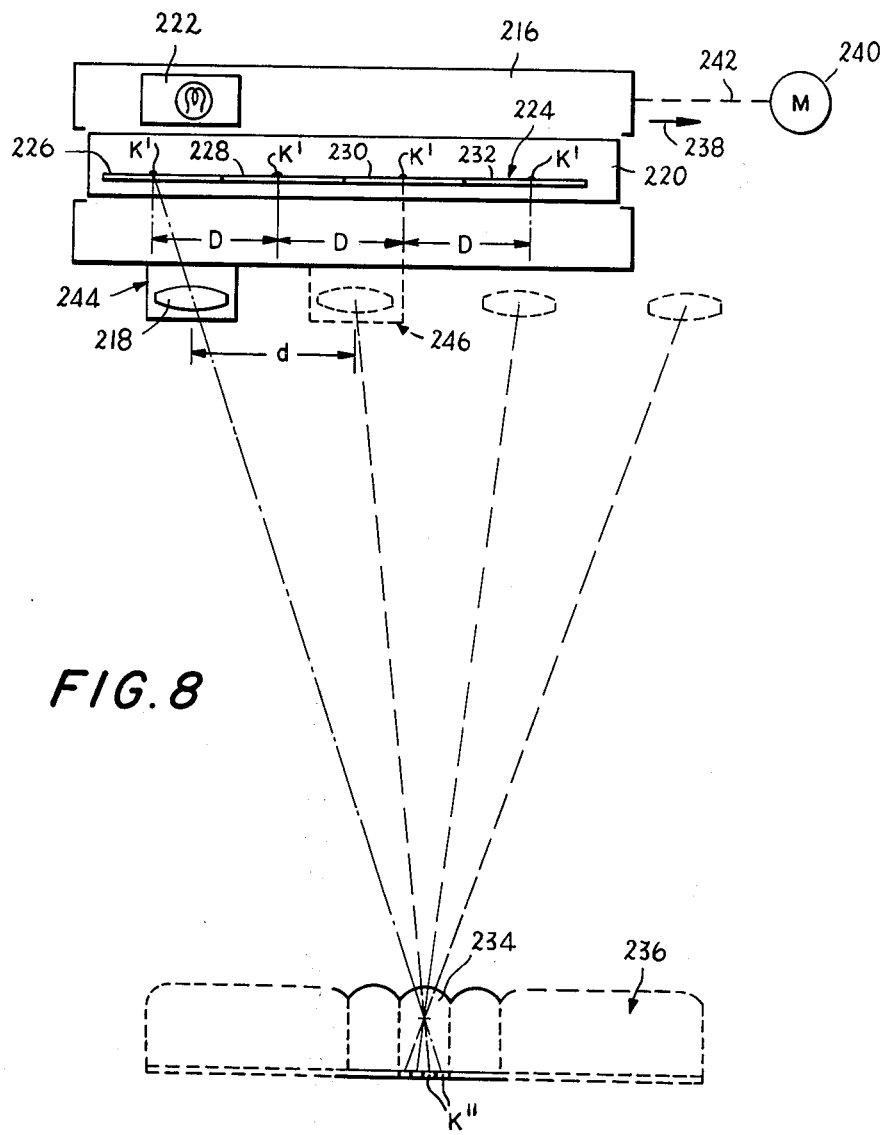
FIG. 8 portrays a representative single-lens composing system according to the invention.
Figure 9:
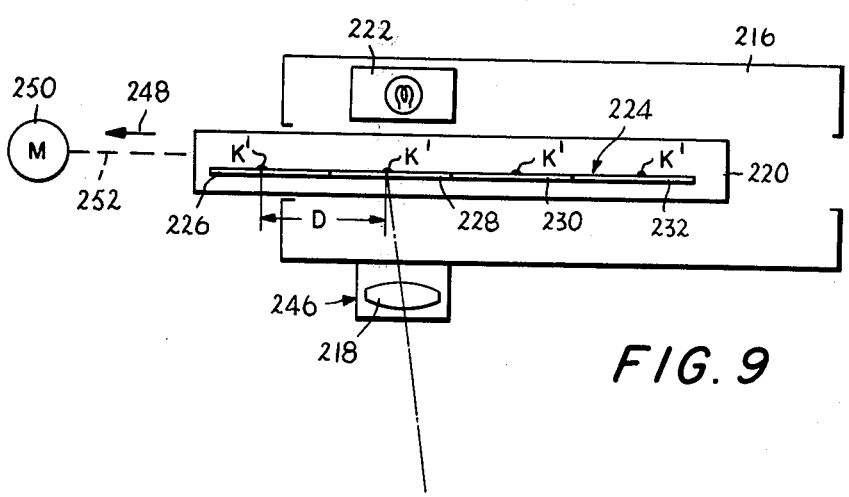
FIG. 9 depicts the single lens system of FIG. 8 in another position of operation.

As an alternative to a projection system having a number of lenses corresponding to the number of lenses in the camera, a system employing a single projecting lens may be used. Such a system is illustrated in FIGS. 8 and 9, wherein a projection housing 216 supports an enlarging lens 218, a negative carrier 220 and a lamp chamber 222. A film strip 224 from one of the previously described multi-lens cameras, bearing, for example, four two-dimensional frames 226, 228, 230 and 232 is supported by the carrier 220 in any convenient fashion. A single-lens system of this nature is especially useful, for example, when the viewing angle Θ of the lenticular film requires an extended projection lens spacing and it is not desirable to cut the film strip for individual placement of the several film frames. The embodiment of FIGS. 8 and 9 depicts this situation.

At the beginning of the composing step, the carrier 220 is positioned relative to the enlarging lens 218 and the lamp chamber 222 such that the projected image of the K' image on the first frame 226 is projected in registry with the preselected reference point. Hence, projection of frame 226 will result in the recordation of a corresponding image K'' beneath lenticule 234 of the lenticular film 236. As the two-dimensional frame 226 represents one endmost view of the object field, the image K'' is recorded adjacent one edge of the lenticule 234. After projection of frame 226, the lamp chamber 222 is turned off and the housing 216 is shifted in the direction of arrow 238, as for example by means of stepping motor 240 coupled to the housing by an appropriate mechanical linkage 242, by a distance sufficient to move the lens 218 from the position shown in full lines at 244 in FIG. 8 to the position shown in phantom lines at 246. That is to say, the lens 218 is shifted through the distance d so that it will be in the proper position for projection of the K' image on the next frame 228 through the center of curvature of lenticule 234. The shifting distance d of the lens 218 is determined in the same manner as with the multi-lens enlarger of FIG. 4 and, once determined, need not be changed during composing.

The lamp chamber 222 and the film strip carrier 220 are also moved in the direction of arrow 238 along with the housing 216 and, upon completion of such movement, are in the positions illustrated in FIG. 9. In order to maintain the proper positional relationship between the frame 228 and the lens 218, however, the film carrier 220 must be shifted in the direction of arrow 248 through the distance D between the K' images on the adjacent frames 226 and 228. The value of D in this instance is determined by the camera lens spacing and may be found from equation (24). A stepping motor 250 and mechanical linkage to the carrier 220 may be provided for this purpose.

When the lens 218, lamp chamber 222 and frame 228 are positioned as in FIG. 9, the lamp chamber 222 is turned on and the image of frame 228 is projected onto the lenticular film 236, thereby forming a second lineiform image K'' beneath the lenticule 234 spaced by substantially w/N from the previously formed image K'' from frame 226.

Thereafter, the foregoing procedure is repeated for frames 230 and 232 until four lineiform images K'' have been recorded beneath the lenticule 234. Of course, lineiform images of other elements of the two-dimensional frames will be recorded beneath other lenticules of the lenticular film 236.

If desired, the foregoing single lens composing procedure may be fully automated, including the feeding and withdrawal of film strips to and from the film strip carrier 220 and the feeding and withdrawal of lenticular film to and from the exposure station. Also, additional film strips may be arranged in parallel on the carrier 220 and projected by use of a common lamp housing 222. In this case, additional enlarging lenses and lenticular films would also be arranged in parallel, thereby enabling simultaneous composing of plural stereoscopic pictures. Such pictures may be of the same photographic scene or of different photographic scenes, as will be determined by the image information on the two-dimensional film strips. In a like manner, automatically controlled parallel film frames, enlarging lenses and lenticular films could be used in the multi-lens composing system of FIG. 4.

Mechanical arrangements of the single-lens system other than that illustrated in FIGS. 8 and 9 may also be employed. For instance, instead of a movable lamp chamber 222, a series of appropriately located, fixed lamps could be used, or a common large lamp chamber might be employed.

SINGLE LENS CAMERA

As a further feature of the invention, significant advantages relative to the prior art may be realized by use of either the multi-lens composing procedure or the single-lens composing procedure described above to compose stereoscopic pictures from two-dimensional views taken with a conventional single-lens camera. In this case, the sequence of two-dimensional views is preferably taken by moving the camera along a straight path transverse to the object field. Camera tracking apparatus and the manner of selection and control of the camera spacing between the vantage points at which the two-dimensional views are taken are fully described in the aforementioned U.S. application Ser. No. 508,810.

For purposes of composing a stereoscopic picture from two-dimensional frames taken with a single-lens camera, the film feeding characteristics of the camera must be taken into account in determining the spacing d of the enlarging lenses. The center-to-center spacing of the film frames within the camera is not T, as in the cameras of FIGS. 5-7, but is instead a value $T_s$ determined by the film feeding characteristics of the camera. The corresponding spacing, here denoted $D_s$, between the K' images on adjacent frames is therefore equal to the value of $T_s$ plus the distance which the K' image shifts along the film frame between adjacent two vantage points. Thus, $$D_s = T_s + T \frac{f_t}{k - f_t} \qquad (31)$$

where the last term represents the distance which the K' image shifts, and is readily determined from equation (2) by substituting T, the distance between camera locations along the straight path, for the term s of that equation.

This change in the relationship of adjacent K' images on the film frames requires associated changes in the relationships between the various components of the enlarging system which depend upon the magnitude of the K' image spacing on the film frames. Hence, the enlarging lens spacing $d_s$ for the multi-lens enlarging system is, from equation (18):

$$d_s = D_s \frac{h}{g + h} \quad \text{and} \qquad (32)$$

the corresponding lenticule width $w_s$, previously determined from equation (23), is given by:

$$w_s = N d_s \frac{j}{nh} \qquad (33)$$

Like changes are required for the single-lens enlarging system of FIGS. 8 and 9.

LINEIFORM IMAGE SCANNING AND QUALITY CONTROL

As mentioned, in order to present a noninterrupted picture to the observer, the area beneath each lenticule of the viewing lenticular screen should be completely filled with lineiform images of the object field. For high quality, it is likewise desirable that adjacent lineiform images do not overlap appreciably and that all of the images be of substantially uniform density.

To minimize variation among the lineiform images because of projection of the two-dimensional views through different areas of the enlarging lenses, light transmission filters are preferably utilized in conjunction with the enlarging lenses. Suitably, the filters have light transmission characteristics which are the converse of those of the enlarging lenses. Thus, whereas the intensity of light transmitted by a typical lens characteristically falls off with distance from its optical axis, the filters would have increasing light transmission efficiency with distance from their centers. The filters would therefore coact with the lenses to provide lineiform images of substantially uniform density.

It may also be desirable, particularly where short focal length lenses are used, to employ taking or enlarging lenses of different focal lengths at the lens locations spaced from the central axis of the camera or enlarger to reduce distortion which otherwise might occur at the edges of the stereoscopic picture due to lack of focus. For example, in the five lens camera illustrated in FIGS. 5 and 6, the two endmost lenses 134 and 142 might each have a focal length of 25mm, the two intermediate lenses 136 and 140 might have a focal length of 25.25mm, and the central lens 138 might have a focal length of 25.5mm. A corresponding five lens enlarger might, for example, have a central lens of 25mm focal length, two intermediate lenses of 25.25mm focal length and two outer lenses of 26.0mm focal length.

Turning now to scanning of the lineiform images and referring to FIG. 3, it has previously been mentioned that the area beneath each lenticule to be occupied by the condensed image from each two-dimensional frame is approximately $x/(N-1)$ in width. In accordance with the invention, this area is filled by scanning the projected image from each frame through the distance $x/(N-1) - m$ during projection of the image. In other words, the angle of incidence of the projected rays upon the lenticular screen is progressively changed during projection so as to traverse, or scan, the condensed image formed by each lenticule over the distance $x/(N-1) - m$. This is done, moreover, in a way which maintains registry of the projected key subject matter image K' with the reference point. If a multi-lens enlarger is used, conveniently scanning of the projected images from all of the frames is carried out simultaneously, so that the stereoscopic picture may be composed in a single step. With the single lens enlarger system of FIGS. 8 and 9, the images from the separate frames are of course scanned separately.

Scanning may be accomplished in three ways: (1) shifting the two-dimensional film frame or frames and the enlarging lens or lenses while holding the lenticular film stationary, (2) shifting the frame or frames and the lenticular film while holding the enlarging lens or lenses stationary, or (3) shifting the enlarging lens or lenses and the lenticular film while keeping the film frame or frames stationary. All three are equivalent and result in the desired relative movement between projected images from the two-dimensional views and the photosensitive surface of the lenticular film. Accordingly, when the lenticular width w is properly selected and there are N frames, the total distance occupied by the expanded lineiform images, or image bands, beneath each lenticule will just fill up the lenticule.

The three basic ways of scanning are illustrated in FIGS. 10A, 10B and 10C. Only one film frame and its associated enlarging lens are depicted in each instance, but it will be understood that in the case of a multi-lens enlarger the scanning relationships developed hereinafter apply to all frames and lenses.

Considering first FIG. 10A, it will be seen that if the condensed image K'' is to be scanned over the distance $x/(N-1) - m$, the enlarging lens 254A must move a distance $Q_1$ and the film frame 256A must move a distance $M_1$, both in the opposite direction (to the left in FIG. 10A) from that in which the image K'' is to be expanded. By trigonometric relations and by reference to equations (18) and (20)–(23), it can be demonstrated that:

$$M_1 = D - m\left(\frac{g+h}{z}\right) \approx d \qquad (41)$$

and that:

$$Q_1 = d - m \frac{h}{z} \approx d \qquad (42)$$

The shifting of the lens 254A and the film frame 256A through the distance $Q_1$ and $M_1$, respectively, may conveniently be implemented by means of an arm 260A pivoted to the lenticular film easel 262A in the plane of the centers of curvature of the lenticules and slidably coupled at its other end to the enlarging lens carrier 264A and the film frame carrier 266A. A stepping motor 268A suitably coupled to the arm 260A may be used to pivot the arm.

In the second form of scanning, depicted in FIG. 10B, the enlarging lens 254B remains stationary while the film frame 256B is moved in one direction (to the left in FIG. 10B) by the distance $M_2$ and the lenticular film 258B is moved in the opposite direction (to the right in FIG. 10B) through the distance $W_2$. By trigonometric relations, it may be seen that:

$$W_2 = Q_1 = d - m \frac{h}{z} \approx d \qquad (43)$$

and that $$M_2 = g \left(\frac{d}{h} - \frac{m}{z}\right) \approx g \frac{d}{h} \qquad (44)$$

The required shifting of the film frame 256B and the lenticular film 258B may readily be accomplished by a common arm 260B pivoted to the lens carrier 264B and slidably coupled at its opposite ends to the lenticular film easel 262B and the film strip carrier 266B. As before, a stepping motor 268B may be used to operate the arm 260B.

According to the third basic scanning technique, illustrated in FIG. 10C, the enlarging lens 254C is shifted by a distance $Q_3$ and the lenticular film 258C shifted by a distance $W_3$, both in the same direction (for example, to the right as seen in FIG. 10C). In this case, it may be shown that the lens shifting distance $Q_3$ is given by:

$$Q_3 = g \left[ \frac{d}{h} - \frac{m}{z} \right] \simeq g \frac{d}{h} \qquad (45)$$

and that the lenticular film shifting distance $W_3$ is equal to:

$$W_3 = D - m \left[ \frac{g + h}{z} \right] \simeq D \qquad (46)$$

Here, again, shifting of the enlarging lens or lenses and the lenticular film may be effected by use of a single arm 260C, the arm in this instance being pivoted to the film frame carrier 266C and slidably coupled at appropriate points along its length to the enlarging lens carrier 264C and the lenticular film easel 262C. A stepping motor 268C may conveniently be used to actuate the arm.

Scanning of the individual lineiform images through the distance $x/(N-1) - m$ along the photosensitive surface may be carried out continuously or intermittently. Continuous scanning has the advantage of speed, thus reducing composing time, and also provides a smoother image over the scanned area. As will be appreciated, scanning of the lineiform images in any one of the foregoing three ways will produce beneath each lenticule a number of condensed images corresponding in number to the number N of two-dimensional frames projected, each of which condensed images will occupy substantially w/N of the area beneath the lenticule. Upon completion of scanning, the projection angle $\beta$ (see FIG. 4) of the enlarging system will be substantially equal to the viewing angle $\theta$ of the lenticular screen. The projection angle $\beta$ is the angle subtended by the endmost projection lens locations. The entire lenticule will therefore be completely filled with images. Moreover, since each condensed image is formed by traversing the projected image over the photosenstive surface, there is substantially no variation in density of the image across the extent of the image. This, coupled with the fact that each condensed image depicts only an expanded image of the same element of a single two-dimensional view, affords a stereoscopic picture of high viewing quality. The quality of the image bands, and hence of the final picture, may be even further enhanced by also using the aforementioned light transmission filters and, where appropriate, taking or composing lenses of different focal lengths.

Although the invention has been described and illustrated with respect to specific embodiments thereof, many modifications and variations of such embodiments may be made by one skilled in the art without departing from the inventive concepts disclosed. For example, the foregoing taking and composing procedures could be used to produce an animated picture by taking sequential two-dimensional views of a changing object field or to produce a changing picture by taking each two-dimensional view (or pair of views) with different objects in the object fields in their entirety. Likewise, the two-dimensional views need not be taken directly from the object field itself, but may instead be made from a transmitted image of the object field, such as is produced, for example, by the image intensifier screen of an x-ray unit or an electron microscope. Again, although the invention has been described herein primarily in connection with cameras having adjustable lens spacings, it will be understood that the invention is equally applicable in certain respects, and particularly in regard to the teachings dealing with proper camera lens spacings and with image scanning during the composing step, to cameras in which the lenses are fixed in place and where adjustments are made in the composing step. Accordingly, all such modifications and variations are intended to be included within the spirit and scope of the appended claims.

We claim:

1. A system for producing stereoscopic pictures, comprising:

a camera for recording a plurality N of two-dimensional views of an object field, said camera including a corresponding plurality N of lenses aligned in a straight path with their optical axes substantially equidistantly spaced apart and substantially in parallel and film support means for positioning unexposed film in image-recording relation to said N lenses;

means in said camera for adjusting the spacing between the optical axes of adjacent lenses as a function of the distance from said lenses to a selected element of the object field to maintain the image of said selected object field element formed by each lens at substantially the same predetermined location on the associated two-dimensional view;

means for projecting respective ones of the two-dimensional views from a corresponding plurality N of predetermined projecting lens locations, with the projected image from each two-dimensional view of said selected object field element in substantial registry with a predetermined reference point, said projecting lens locations being aligned in a straight path and substantially equidistantly spaced apart by a distance which is related by a substantially constant factor to the distance between said image locations on adjacent two-dimensional views;

a lenticular screen of lenticule width w positioned opposite said projection locations with a lenticule thereof in substantial alignment with said reference point; and a photosensitive surface positioned at the rear face of said lenticular screen.

2. The system of claim 1 wherein:

the projecting means includes a projecting lens at each of said N projecting lens locations;

one of said N two-dimensional views is positioned in projecting relation to each of said N projecting lenses; and the distance between adjacent projecting lenses is such that the distance between said image locations on adjacent two-dimensional views when said views are positioned in projecting relation to said N projecting lenses is substantially equal to the distance between said image locations on adjacent two-dimensional views as recorded in the camera.

3. The system of claim 1 wherein:
the projecting means includes a projecting lens at each of said N projecting lens locations;
one of said two-dimensional views is positioned in projecting relation to each of said projecting lenses; and
the distance between adjacent projecting lenses is such that the distance between said image locations on adjacent two-dimensional views when said views are positioned in projecting relation to said N projecting lenses is greater than the distance between said image locations on adjacent two-dimensional views as recorded in the camera.

4. The system of claim 1 wherein the projecting means includes:
a single projecting lens;
means for moving said projecting lens to each of said N projecting lens locations; and
means for positioning one of said N two-dimensional views in projecting relation to the projecting lens at each of said projecting lens locations.

5. The system of claim 4 wherein the distance between adjacent projecting lens locations is such that the distance between said image locations on adjacent two-dimensional views when said views are positioned at adjacent projecting lens locations is greater than the distance between said image locations on adjacent two-dimensional views as recorded in the camera.

6. The system of claim 1 wherein:
said N projecting lens locations are substantially centered on said reference point; and
the distance between adjacent projecting lens locations is such that the projected images from said two-dimensional views falling on each lenticule of the lenticular screen form on the photosensitive surface therebehind a corresponding plurality N of condensed images which are spaced apart by substantially w/N.

7. The system of claim 6 wherein:
the individual condensed images are less than w/N in width; and
the projecting means further includes means for changing the angle of projection of each two-dimensional view during the projection thereof by an amount sufficient to expand the width of the corresponding one of said N condensed images behind each lenticule to substantially w/N.

8. The system of claim 7 wherein N is within the range of from 3 to 6, inclusive.

9. The system of claim 7 wherein the projection angle subtended by the endmost projecting lens after expansion of the condensed images is substantially equal to the lenticule viewing angle of the lenticular screen.

10. The system of claim 1 wherein said photosensitive surface comprises a photosensitive emulsion layer coated on the rear surface of said lenticular screen.

11. In a camera for taking three or more two-dimensional views of an object field for use in composing a stereoscopic picture of the type incorporating a viewing lenticlar screen of lenticule width w, the camera including a corresponding number of lenses aligned in a straight path with their optical axes substantially equidistantly spaced apart and substantially in parallel and film support means for positioning unexposed film in image-recording relation to said lenses, the improvement comprising:
means for adjusting the spacing between the optical axes of ajacent lenses as a function of the distance from said lenses to a selected element of the object field to maintain the image of said selected object field element formed by each lens at substantially the same predetermined location on the associated two-dimensional view.

12. The camera of claim 11 wherein the lens-spacing adjusting means includes means for focusing the lenses on said selected object field element simultaneously with adjusting the spacing between adjacent lenses.

13. The camera of claim 11 wherein the lens-spacing adjusting means comprises means fixing said lenses against focusing adjustment while permitting said spacing adjustment.

14. The camera of claim 11 wherein the number of lenses is no more than six.

15. The camera of claim 11 wherein the widest spacing between the optical axes of adjacent lenses is not greater than substantially 1 ½ times the width of the two-dimensional views.

16. Apparatus for composing a stereoscopic picture of the type including a multiplicity of image bands, each of said image bands comprising a plurality N of condensed images from a corresponding plurality N of two-dimensional views of an object field taken from spaced vantage points, and a lenticular screen having a corresponding multiplicity of lenticules aligned with the image bands, comprising:
means including at least one projecting lens for projecting respective ones of said N two-dimensional views from a corresponding plurality N of projecting lens locations with the projected image of a selected element of each view in substantially registry with a reference point;
means for positioning a lenticular screen of lenticule width w opposite said projecting lens locations with a lenticule thereof in substantial registry with said reference point; and
means for changing the angle of projection of each two-dimensional view by a predetermined amount during the projection thereof while maintaining the projected image of said selected element thereof in substantial registry with said reference point, said angle changing means comprising means for simultaneously shifting the positions of any two of said N two-dimensional views, said projecting means and said lenticular screen so as to change the angle of projection by the predetermined amount while maintaining the relationship of the distance between said selected element of each two-dimensional view and its projecting lens and the distance between such projecting lens and the lenticular screen substantially constant.

17. The apparatus of claim 1 wherein the shifting means comprises means for continuous shifting said positions during the projection of each view.

18. The apparatus of claim 16 wherein:
said N projecting lens locations are substantially centered on said reference point and are substantially equidistantly spaced apart along a straight path by a distance such that the plurality N of condensed images formed by each lenticule of the lenticular screen from the projected images of said two-dimensional views will be spaced apart by substantially $w/N$; and the predetermined amount by which the projection angle of each two-dimensional view is changed is sufficient to expand the width of the corresponding one of said N condensed images formed by each lenticule to substantially $w/N$.

19. The system of claim 18 wherein the projection angle subtended by the endmost projecting lens locations after expansion of the condensed images is substantially equal to the lenticule viewing angle of the lenticular screen.

20. The apparatus of claim 18 wherein:

the projecting means includes a projecting lens at each of said N projecting lens locations, means for supporting one of said N two-dimensional views in projecting relation to each of said N projecting lenses, and means for simultaneously projecting all N two-dimensional views; and the angle changing means comprises means for simultaneously changing the projection angle of all of said N two-dimensional views.

21. The system of claim 18 wherein the projecting means includes:

a single projecting lens;

means for moving said projecting lens to each of said N projecting lens locations; and means for positioning one of said N two-dimensional views in projecting relation to the projecting lens at each of said projecting lens locations.

* * * * *

UNITED STATES PATENT AND TRADEMARK OFFICE
CERTIFICATE OF CORRECTION

PATENT NO. : 3,953,869
DATED : April 27, 1976
INVENTOR(S) : Allen Kwok Wah Lo and Jerry Curtis Nims It is certified that error appears in the above-identified patent and that said Letters Patent are hereby corrected as shown below:

Col. 8, line 17, "$D_K$" should read --$D_K'$--;
line 58, "he" should read --the--;
Col. 10, line 28, "$I = w \frac{(1 + z)}{h}$ (21)"

should read --$I = w \frac{(1 + z)}{h}$ (21)--;

Col. 16, line 12, "If, an" should read --If as developed hereinafter an--;

Col. 20, line 35, "$M_1 = D - m \left(\frac{g + h}{z}\right) \approx d$ (41)"

should read --$M_1 = D - m \left(\frac{g + h}{z}\right) \approx D$ (41)--;

Col. 22, line 7, "in the object fields" should read --in the object field or even of different object fields--.

Signed and Sealed this

Fifteenth Day of March 1977

[SEAL]

Attest:

RUTH C. MASON
Attesting Officer

C. MARSHALL DANN
Commissioner of Patents and Trademarks